US006297341B1

(12) United States Patent
Ueki et al.

(10) Patent No.: US 6,297,341 B1
(45) Date of Patent: Oct. 2, 2001

(54) SILICONE-CONTAINING POLYIMIDE RESIN, SILICON-CONTAINING POLYAMIC ACID, AND METHODS FOR MANUFACTURE

(75) Inventors: Hiroshi Ueki; Yoshitsugu Morita; Haruhiko Furukawa, all of Chiba Perfecture (JP)

(73) Assignee: Dow Corning Toray Silicone Company LTD, Tokyo (JP)

( * ) Notice: Subject to any disclaimer, the term of this patent is extended or adjusted under 35 U.S.C. 154(b) by 0 days.

(21) Appl. No.: 09/548,649

(22) Filed: Apr. 13, 2000

(30) Foreign Application Priority Data

Apr. 30, 1999 (JP) .................................... 11-124559

(51) Int. Cl.[7] .................................................. C08G 77/26
(52) U.S. Cl. ................................. 528/26; 528/38
(58) Field of Search .......................................... 528/26, 38

(56) References Cited

U.S. PATENT DOCUMENTS

| 4,609,700 | * | 9/1986 | Kunimune et al. | 524/104 |
|---|---|---|---|---|
| 4,670,497 | | 6/1987 | Lee | 524/377 |
| 5,015,700 | * | 5/1991 | Herzig et al. | 525/487 |
| 5,252,703 | | 10/1993 | Nakajima et al. | 525/423 |
| 5,262,506 | | 11/1993 | Okawa et al. | 528/27 |
| 5,300,627 | * | 4/1994 | Kunimune et al. | 528/353 |
| 5,376,733 | * | 12/1994 | Okinoshima et al. | 525/431 |
| 5,473,040 | * | 12/1995 | Kunimune et al. | 528/26 |
| 5,922,411 | * | 7/1999 | Shimizu et al. | 427/397.7 |
| 6,001,942 | * | 12/1999 | Amako et al. | 528/10 |

FOREIGN PATENT DOCUMENTS

| 58027722 | 2/1983 | (JP) | C08G/73/10 |
|---|---|---|---|
| 61118424 | 6/1986 | (JP) | C08K/5/06 |
| 4036321 | 2/1992 | (JP) | C08G/69/48 |
| 4323222 | 11/1992 | (JP) | C08G/77/26 |

* cited by examiner

Primary Examiner—Margaret G. Moore
(74) Attorney, Agent, or Firm—William F. Boley; Timothy J. Troy

(57) ABSTRACT

A silicone-containing polyimide resin, a silicone-containing polyamic acid, and methods for manufacturing these. More particularly, a silicone-containing polyimide resin with superior heat resistance and flexibility, a silicone-containing polyamic acid for which this polyimide resin is a raw material, and methods for manufacturing these.

11 Claims, No Drawings

SILICONE-CONTAINING POLYIMIDE RESIN, SILICON-CONTAINING POLYAMIC ACID, AND METHODS FOR MANUFACTURE

BACKGROUND OF INVENTION

The present invention relates to a silicone-containing polyimide resin, a silicone-containing polyamic acid, and methods for manufacturing these. More particularly, it relates to a silicone-containing polyimide resin with superior heat resistance and flexibility, to a silicone-containing polyamic acid for which this polyimide resin is a raw material, and methods for manufacturing these.

Because of their excellent mechanical properties, heat resistance, and so on, polyimide resins are widely used as molding materials, films, and coating agents. In general, however, a polyimide resin has poor molding workability, flexibility, and solubility in solvents, so there has been proposed a method in which a polyorganosiloxane having amino groups at both ends of the molecular chain is copolymerized as a soft segment (see Japanese Laid-Open Patent Application 4-36321). Nevertheless, a problem with a silicone-containing polyimide resin obtained in this manner is that because the polyorganosiloxane chain is so long, low-molecular weight cyclic siloxane is generated by a cleavage reaction of the polyorganosiloxane chain under high temperature environments, the result of which is a decrease in heat resistance. Accordingly, there has been proposed a silicone-containing polyimide resin in which a disiloxane chain with two silicon atoms is copolymerized (see Japanese Laid-Open Patent Applications 58-27722 and 61-118424), but a drawback was that the two silicon atoms did not sufficiently improve flexibility. In light of this, there is a need for a polyimide resin with superior heat resistance and flexibility.

As a result of diligent study, the inventors arrived at the present invention upon discovering that the above problems can be solved by copolymerizing an organosiloxane having a specific chemical structure. Specifically, it is an object of the present invention to provide a silicone-containing polyimide resin with superior heat resistance and flexibility, a silicone-containing polyamic acid that serves as the raw material for this polyimide resin, and methods for manufacturing these.

SUMMARY OF INVENTION

The present invention is:

(1) a silicone-containing polyimide resin comprising 0.1 to 100 mol % structural units described by formula 1

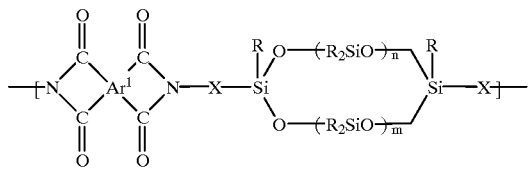

and 0 to 99.9 mol % structural units described by formula 2:

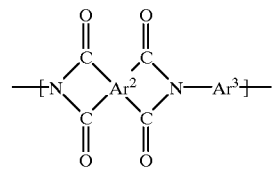

where $Ar^1$ and $Ar^2$ are tetravalent organic groups having at least one aromatic ring; $Ar^3$ is a divalent organic group having at least one aromatic ring; each R is an independently selected monovalent hydrocarbon group free of aliphatic unsaturated bonds; X is an alkylene group or alkyleneoxyalkylene group having at least two carbon atoms; m and n are integers from 0 to 3, and (m+n) is an integer from 1 to 6;

(2) a silicone-containing polyamic acid comprising 0.1 to 100 mol % structural units described by formula

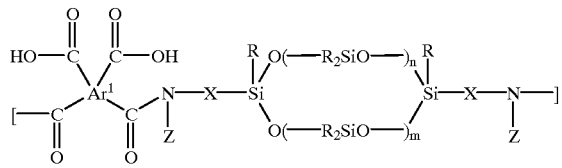

and 0 to 99.9 mol % structural units described by formula

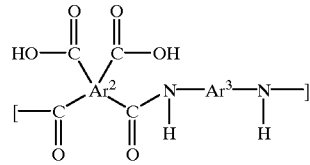

where $Ar^1$ and $Ar^2$ are tetravalent organic groups having at least one aromatic ring; $Ar^3$ is a divalent organic group having at least one aromatic ring; each R is an independently selected monovalent hydrocarbon group free of aliphatic unsaturated bonds; X is an alkylene group or alkyleneoxyalkylene group having at least two carbon atoms; Z is a hydrogen atom or a silyl group described by formula —$SiR_3$ where R is as defined above; m and n are integers from 0 to 3, and (m+n) is an integer from 1 to 6; and (3) to methods for manufacturing these.

DESCRIPTION OF INVENTION

The present invention is a polyimide, a silicone-containing polyamic acid, and a method for preparation of both.

The silicone-containing polyimide resin comprises 0.1 to 100 mol % structural units described by formula 1

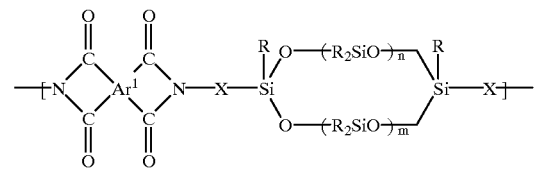

and 0 to 99.9 mol % structural units described by formula 2:

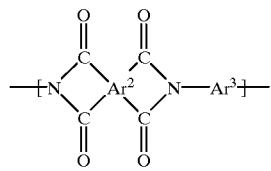

where Ar$^1$ and Ar$^2$ are tetravalent organic groups having at least one aromatic ring; Ar$^3$is a divalent organic group having at least one aromatic ring; each R is an independently selected monovalent hydrocarbon group free of aliphatic unsaturated bonds; X is an alkylene group or alkyleneoxyalkylene group having at least two carbon atoms; m and n are integers from 0 to 3, and (m+n) is an integer from 1 to 6;

The silicone-containing polyamic acid comprises 0.1 to 100 mol % structural units described by formula

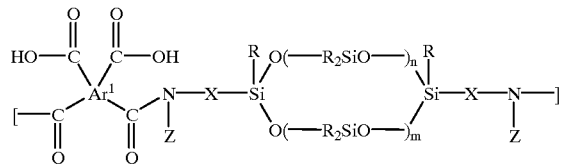

and 0 to 99.9 mol % structural units described by formula

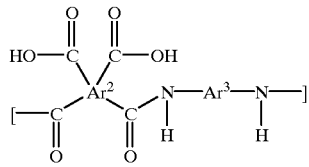

where Ar$^1$ and Ar$^2$ are tetravalent organic groups having at least one aromatic ring; Ar$^3$ is a divalent organic group having at least one aromatic ring; each R is an independently selected monovalent hydrocarbon group free of aliphatic unsaturated bonds, and the; X is an alkylene group or alkyleneoxyalkylene group having at least two carbon atoms; Z is a hydrogen atom or a silyl group described by formula —SiR$_3$ where R is as defined above; m and n are integers from 0 to 3, and (m+n) is an integer from 1 to 6.

First, the silicone-containing polyimide resin of the present invention will be described. The silicone-containing polyimide resin of the present invention consists of structural units described by the following formula 1 alone, or consists of structural units described by the following formulas 1 and 2.

(Chemical Formulas 1)

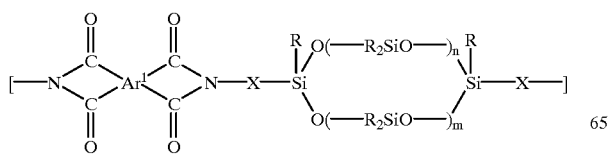

(Chemical Formula 2)

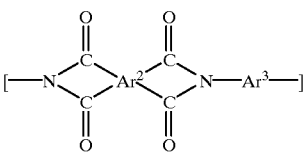

In the above formulas, Ar$^1$ and Ar$^2$ are tetravalent organic groups having at least one aromatic ring, examples of which include groups described by the following formulas.

(Chemical Formulas 19)

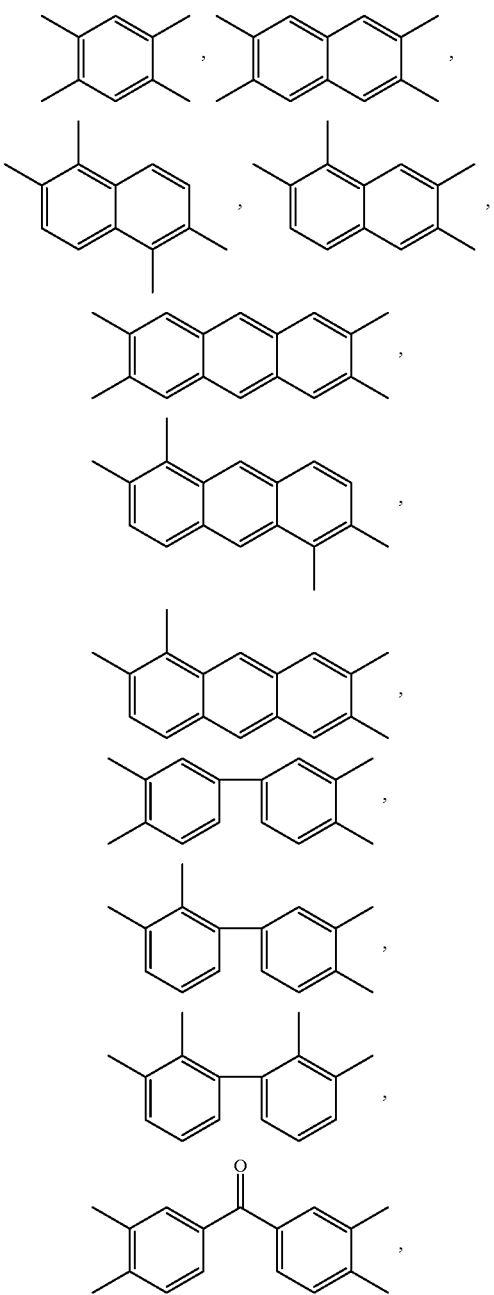

-continued
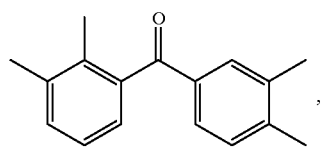
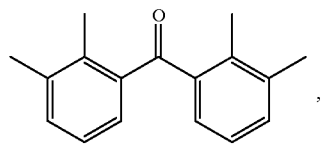
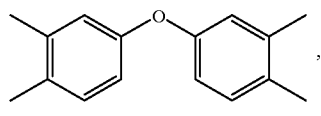
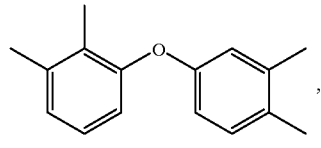
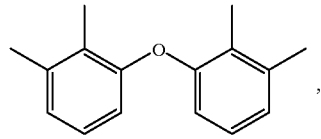
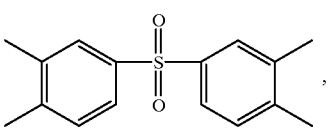
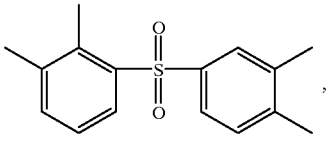
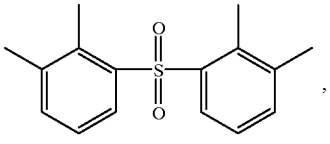
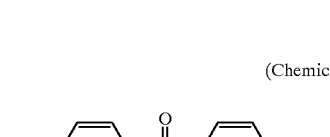
(Chemical Formulas 20)
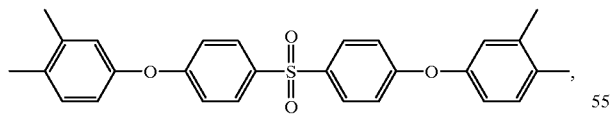
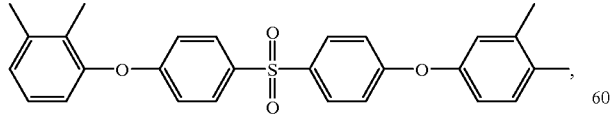
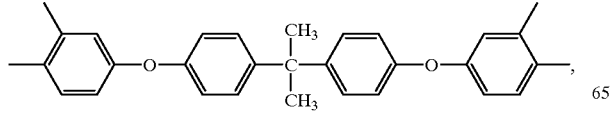
-continued
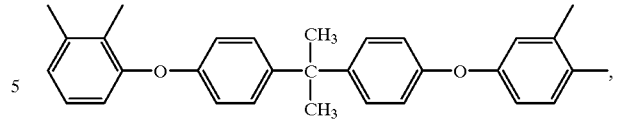
Of these, groups described by the following formulas are preferred.
(Chemical Formulas 21)
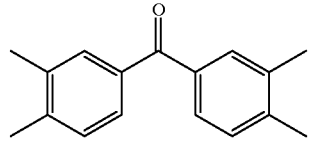
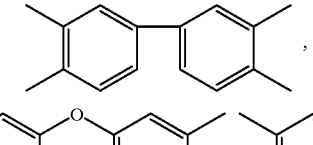
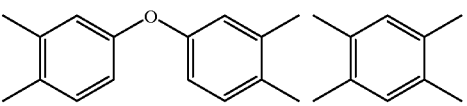
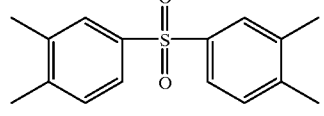
$Ar^3$ is a divalent organic group having at least one aromatic ring, examples of which include groups described by the following formulas.
(Chemical Formulas 22)
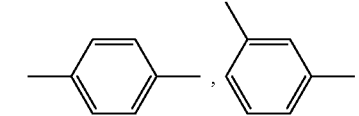
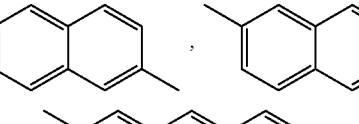
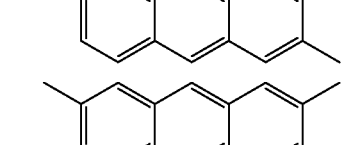
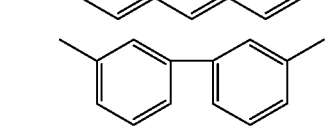
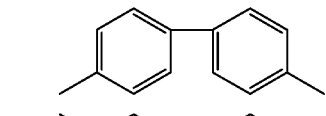
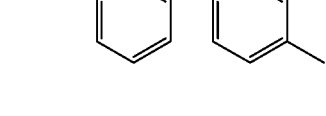

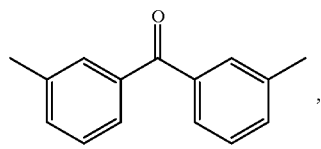,
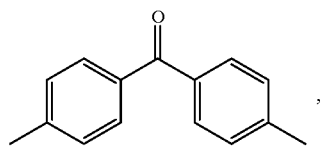,
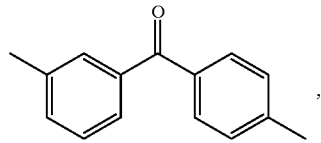,
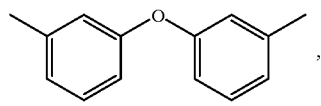,
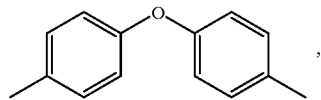,
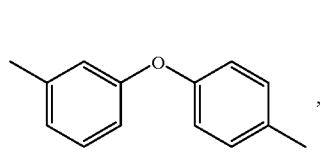,
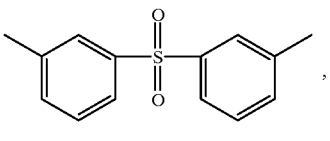,
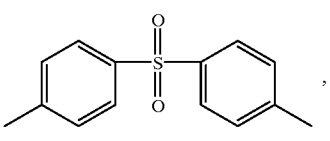,
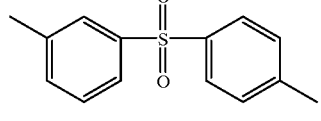,
(Chemical Formulas 23)
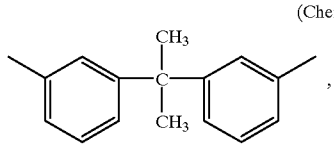,
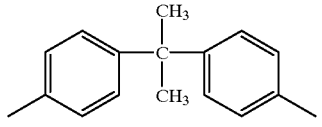,
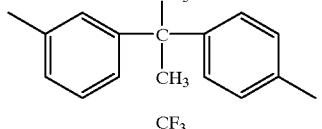,
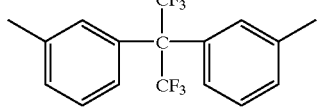,
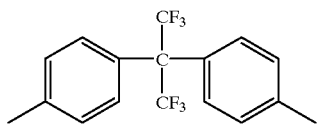,
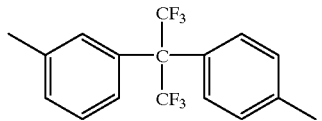,
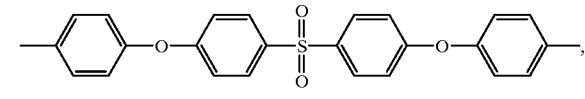,
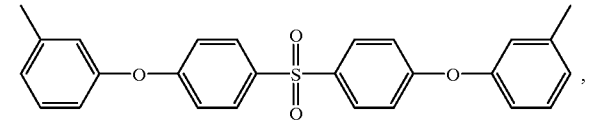,
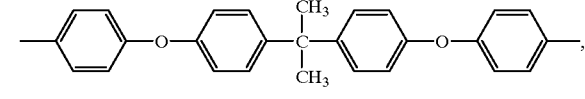,
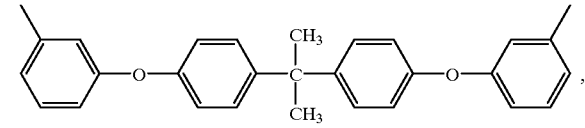,
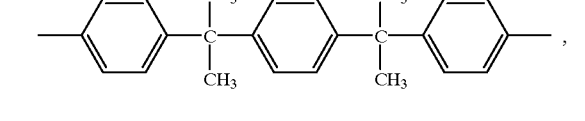,
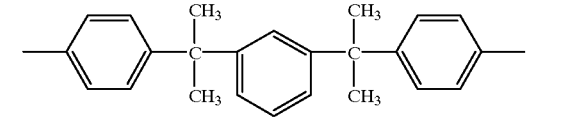,
Of these, groups described by the following formulas are preferred.

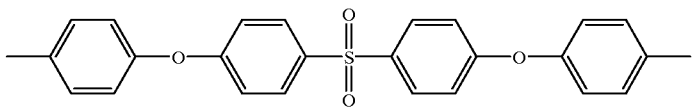

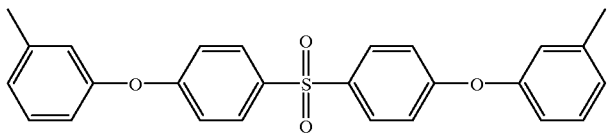

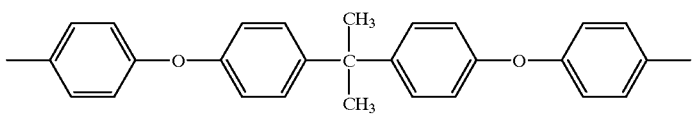

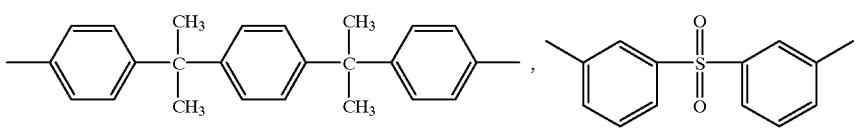

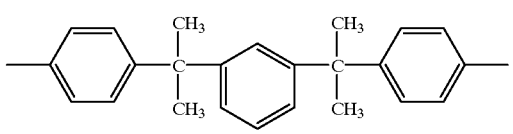

Each R is an independently selected monovalent hydrocarbon group free of aliphatic unsaturation. Specific examples of R include alkyl groups such as methyl, ethyl, propyl, butyl, pentyl, and hexyl; aryl groups such as phenyl, tolyl, and xylyl; and aralkyl groups such as benzyl and phenethyl. X is an alkylene group or alkyleneoxyalkylene group having at least two carbon atoms, specific examples of which include ethylene, propylene, butylene, pentylene, hexylene, and ethyleneoxypropylene. The letters m and n represent integers from 0 to 3, and (m+n) must be an integer from 1 to 6. It is preferred for (m+n) to be 2, in which case it is preferable for both m and n to be 1.

In the silicone-containing polyimide resin of the present invention, the copolymerization ratio of the above-mentioned structural units is such that (structural units described by formula 1): (structural units described by formula 2) is between 0.1:99.9 and 100:0 mol %, and preferably between 1:99 and 100:0 mol %. This silicone-containing polyimide resin is in the form of a solid at 25° C., but may be dissolved in a solvent and made into a liquid at the time of its use. The intrinsic viscosity thereof (the value for an N-methylpyrrolidone solution measured at 25° C.) is usually between 0.1 and 3.0 dL/g, and preferably between 0.2 and 2.0 dL/g.

The present silicone-containing polyimide resin can be manufactured by heating a silicone-containing polyamic acid composed of 0.1 to 100 mol % structural units described by the following formula A and 0 to 99.9 mol % structural units described by formula B to effect dehydration cyclization to produce an imide:

(Chemical Formulas 24)

Formula A (Chemical Formula 25)

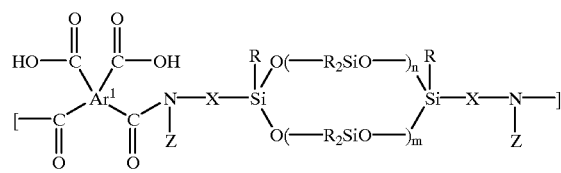

Formula B (Chemical Formula 26)

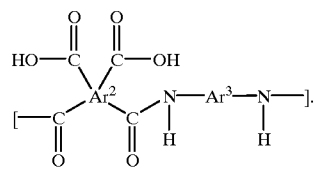

In the above formulas, $Ar^1$, $Ar^2$, $Ar^3$, R, X, m, and n are defined the same as above. Z is a hydrogen atom or a silyl group described by formula $—SiR_3$ where R is as defined above. Examples of methods for cyclization by heating and dehydration include a method in which a substrate is directly coated with a solution of the polyamic acid, and this coating is heat treated to produce a film, and a method in which a non-polar organic solvent that is not miscible with water is added to the polyamic acid and azeotropic dehydration is performed, after which the water thus produced is removed, and the remainder is then applied to a substrate and heat treated. The heat treatment conditions here preferably comprise a temperature range of 50 to 400° C. The intrinsic viscosity of this silicone-containing polyamic acid (the value for an N-methylpyrrolidone solution measured at 25° C.) is usually between 0.1 and 3.0 dL/g, and preferably between 0.2 and 2.0 dL/g.

The silicone-containing polyamic acid of the present invention can be manufactured by polymerizing a tetracarboxylic dianhydride described by formula C with divalent amine compounds described by formulas D and E.

Formula C (Chemical Formula 27):

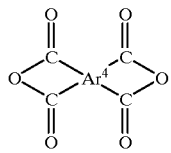

Formula D (Chemical Formula 28):

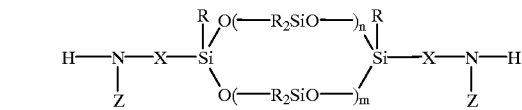

Formula E:

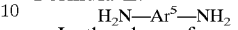

In the above formulas, $Ar^4$ is a tetravalent organic group having at least one aromatic ring, examples of which are the same as those given for $Ar^1$ and $Ar^2$ above. $Ar^5$ is a divalent organic group having at least one aromatic ring, examples of which are the same as those given for $Ar^3$ above. R, X, Z, m, and n are defined the same as above.

Examples of the tetracarboxylic dianhydride described by formula C above include compounds described by the following formulas.

(Chemical Formulas 29)

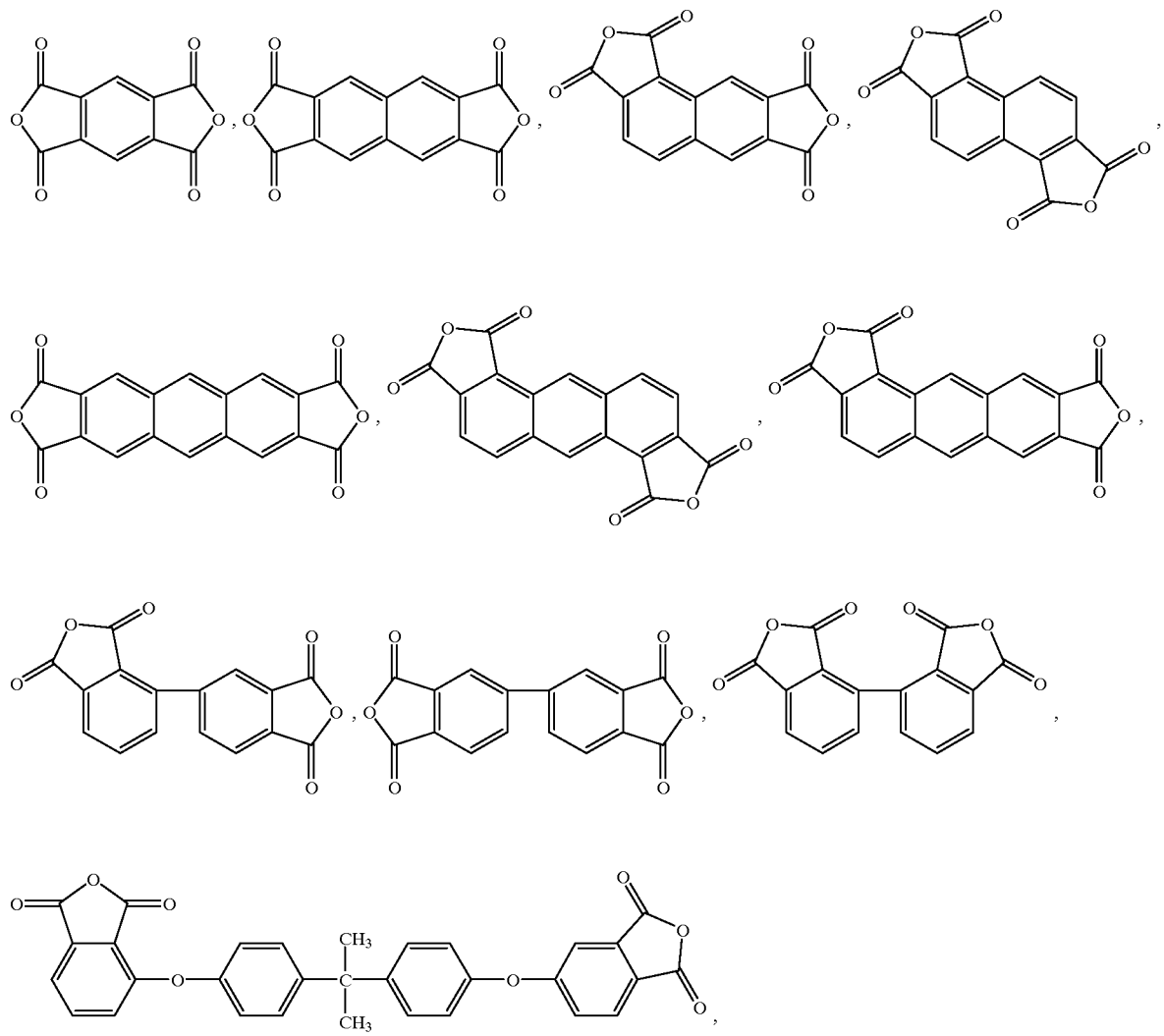

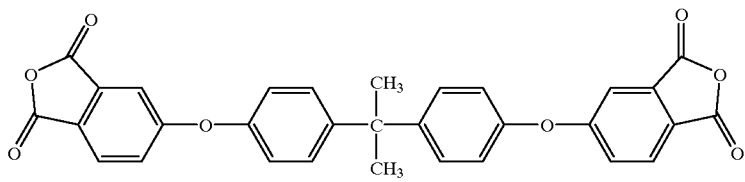
(Chemical Formulas 30)
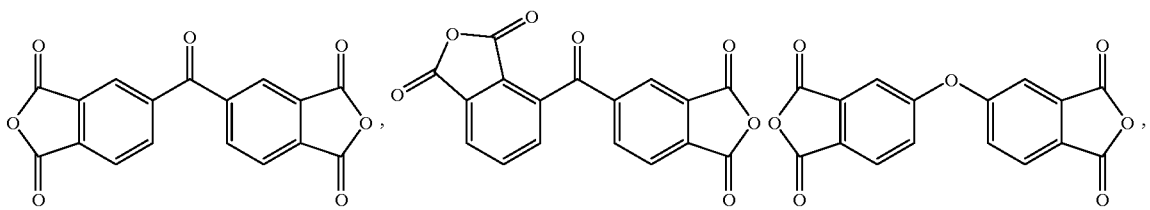
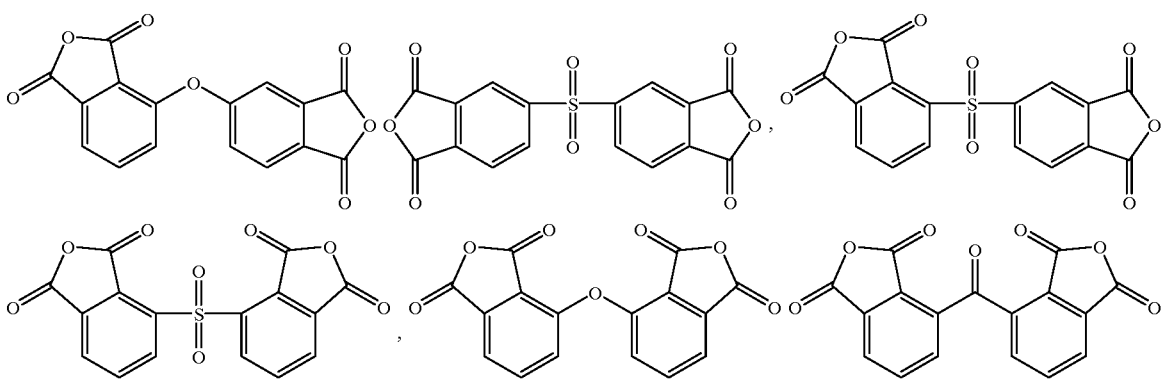
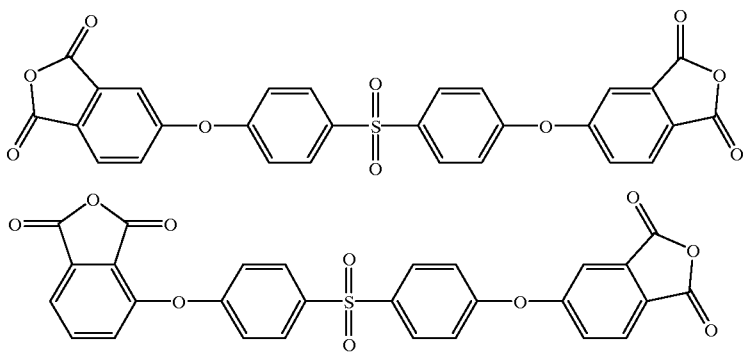
Examples of the silicone-based divalent amine compound described by formula D above include compounds described by the following formulas.
(Chemical Formulas 31)
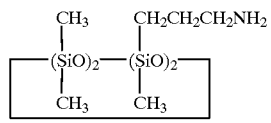 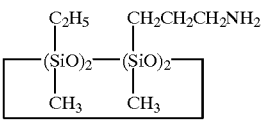
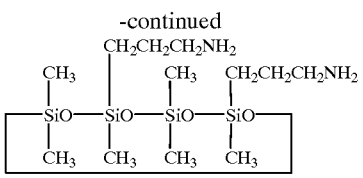
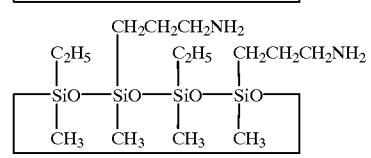

These silicone-based divalent amine compounds can be manufactured, for example, by subjecting a silicon atom-bonded hydrogen atom-containing cyclic organosiloxane described by formula:

(Chemical Formula 32)

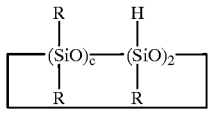

where R is defined the same as above, and c is (m+n) to an addition reaction with trimethylsilylallylamine in the presence of a platinum catalyst, and then removing the trimethylsilyl groups (see Japanese Laid-Open Patent Application 4-323222).

Examples of the divalent amine compound described by formula E above include compounds described by the following formulas.

(Chemical Formulas 33)

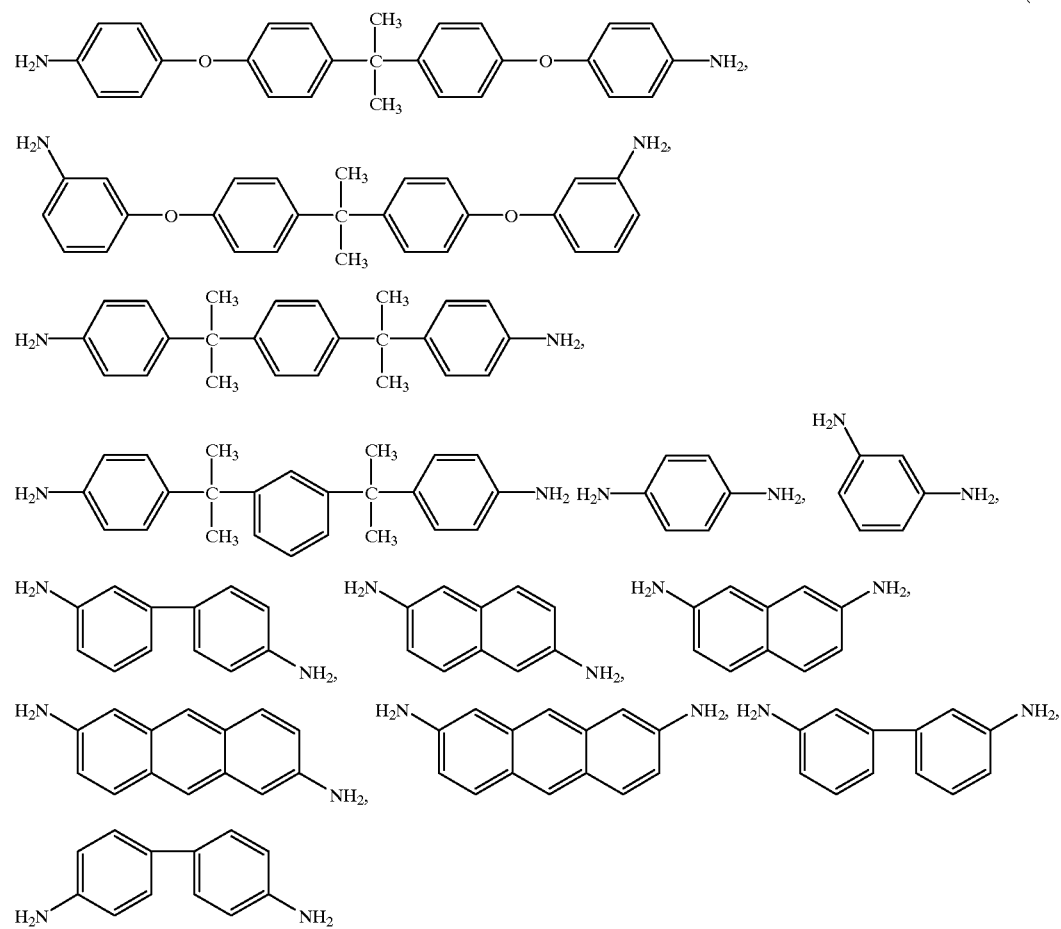

(Chemical Formulas 34)

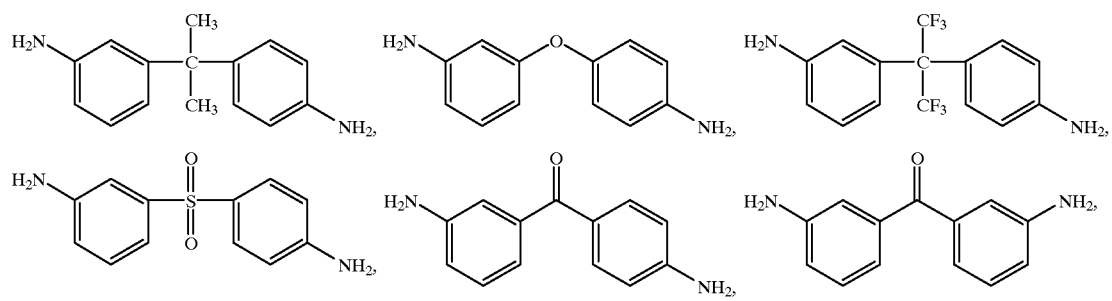

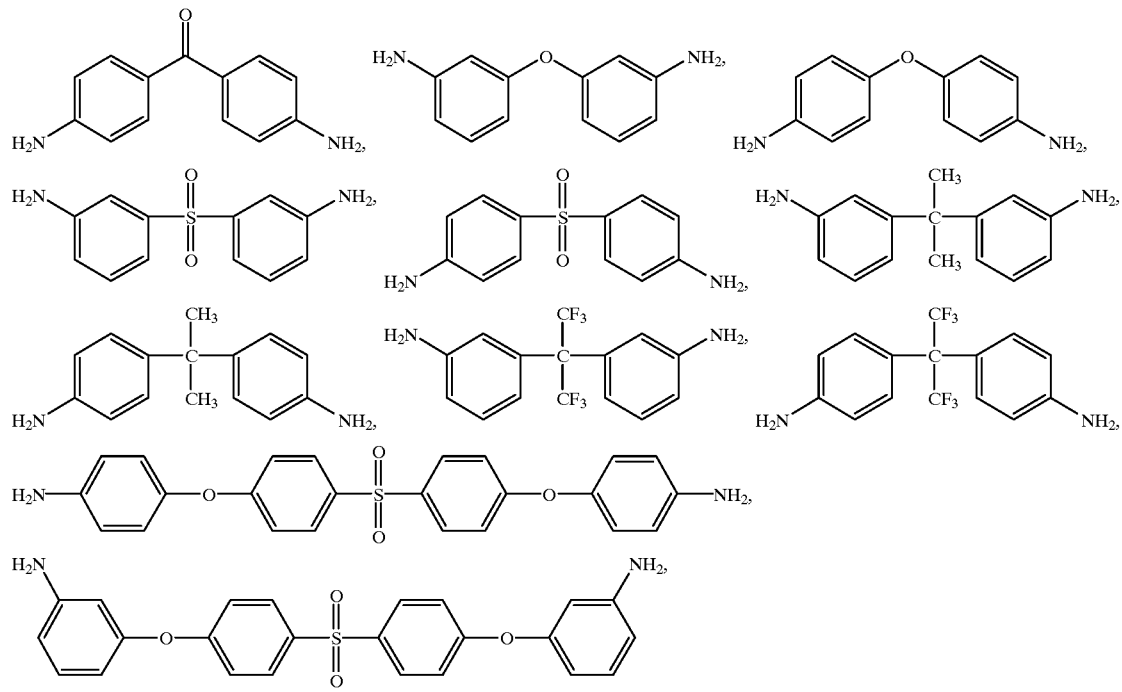

The polymerization reaction of the tetracarboxylic dianhydride described by formula C and the divalent amine compounds described by formulas D and E can be carried out by conventional methods. For instance, one method involves subjecting the above-mentioned tetracarboxylic dianhydride and divalent amine compounds to a reaction in a polar solvent at a temperature of 0 to 8° C. There are no particular restrictions on the order in which the components are added here, but one preferred method is to put the tetracarboxylic dianhydride in a polar solvent, then add and allow to react the silicone-based divalent amine compound described by formula D, and then add and allow to react the divalent amine compound described by formula E, either by itself or as a polar solvent solution. The polar solvent used in the above reaction can be, for example, N-methyl-2-pyrrolidone, N,N-dimethylformamide, N,N-dimethylacetamide, dimethyl sulfoxide, tetrahydrofuran, or the like, or a mixture of these. In addition to these inert solvents, a non-polar solvent, such as toluene or xylene, may be added as needed for the purpose of enhancing the solubility of the silicone-based divalent amine compound described by formula D. Also, to the extent that the object of the present invention is not compromised, a linear silicone-based divalent amine compound described by the following formula F may be added.

(Chemical Formula 35)

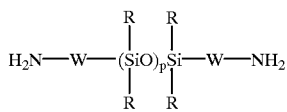

In the above formula, R is defined the same as above, W is a substituted or unsubstituted divalent hydrocarbon group having at least two carbon atoms, and p is a number from 0 to 80. A monovalent amine compound such as aniline or a divalent carboxylic anhydride such as phthalic anhydride may also be used as a molecular weight regulator or a terminator.

The advantage of the above-mentioned silicone-containing polyimide resin of the present invention is that it has the excellent mechanical properties, heat resistance, and flexibility inherent to polyimide resins, and in addition also has good water repellency, adhesion, solvent solubility, and molding workability. In particular, since the specific cyclic organosiloxane that serves as the copolymerization component is not volatilized even under a high temperature environment, the resin of the present invention is characterized by heat resistance and flexibility that are both superior. Accordingly, the silicone-containing polyimide resin of the present invention can be used to advantage in coatings and films, for molding, and as an adhesive agent.

The present invention will now be described through working examples. In these examples, the viscosity is the value measured at 25° C. The pyrolysis temperature, contact angle, and modulus of elasticity of the obtained polyimide resins were measured by the following methods.

Pyrolysis Temperature

Using a thermogravimetric analyzer (TGA-50, made by Shimadzu Seisakusho), the polyimide resin was heated under a nitrogen gas flow at a temperature ramp rate of 15° C./minute, the temperature at which the heating weight loss reached 1 wt % and the temperature at which it reached 5 wt % were measured, and these were termed the pyrolysis temperature.

Contact Angle

A sample with a thickness of approximately 60 μm was produced, and its contact angle with respect to water was measured using an automatic contact angle gauge (model CA-Z, made by Kyowa Kaimen Kagaku).

Modulus of elasticity

A sample with a thickness of approximately 60 μm and a width of 1 mm was produced, this sample was pulled at a crosshead speed of 50 mm/ minute using a tensile tester (RTC-1325A, made by Orientech), and the modulus at a displacement of 1% was measured.

Working Example 1

17.59 g Of 3,3',4,4'-benzophenonetetracarboxylic dianhydride were supplied under a nitrogen gas flow to a 500 mL four-neck flask equipped with an agitator, a dropping funnel, and a thermometer. 120 g Of dried N-methylpyrrolidone were added and dissolved, and then 8 g of a mixture (mixing ratio: 50:50 mol %) of dried silicone-based divalent amine compounds described by the following formulas:

(Chemical Formula 36)

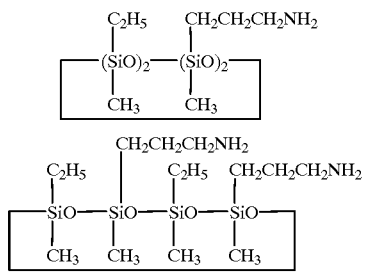

was added dropwise at room temperature. Upon completion of the addition, the mixture was stirred for another hour at room temperature. A solution produced by dissolving 14.52 g of 2,2-bis(2-diaminophenoxyphenyl)propane in 80 g of dried N-methylpyrrolidone was then slowly added dropwise under ice cooling. Upon completion of this addition, the system was agitated for another hour under ice cooling, then for another 4 hours at room temperature, which yielded an N-methylpyrrolidone solution of a silicone-containing polyamic acid composed of structural units described by the following formulas.

(Chemical Formulas 37)

Structural Formula A-1:

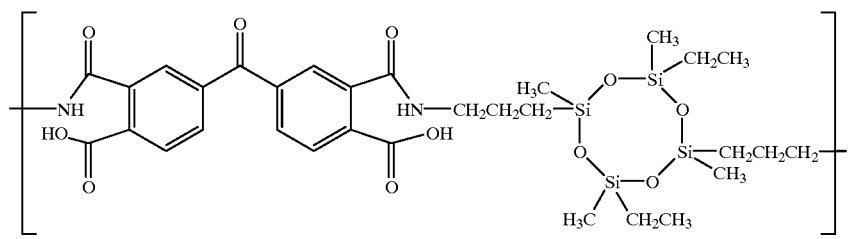

Structural Formula A-2:

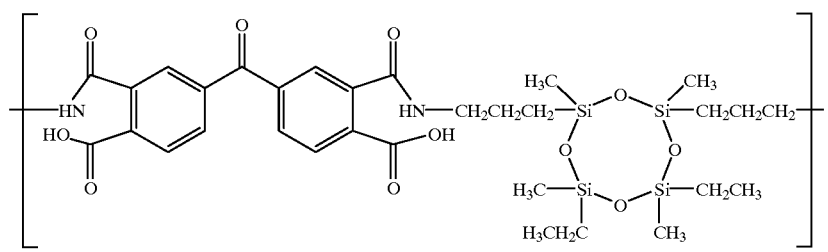

Structural Formula B:

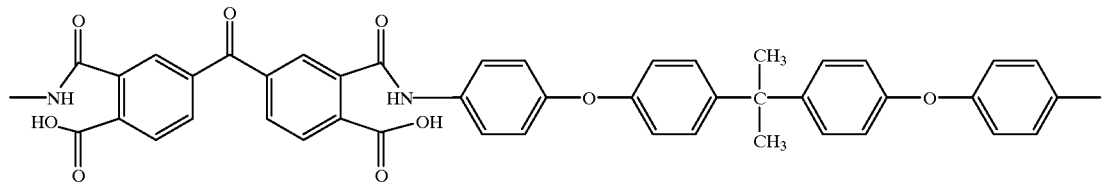

The copolymerization ratio (mol %) of (structural units described by the above Structural Formula A-1):(structural units described by Structural Formula A-2):(structural units described by Structural Formula B) was 17.5:17.5:65. The intrinsic viscosity of the silicone-containing polyamic acid obtained in this manner was measured in N-methylpyrrolidone and found to be 0.35 dL/g.

This N-methylpyrrolidone solution of a silicone-containing polyamic acid was used to coat a Teflon substrate, and this coating was slowly heated from 100° C. to 180° C. under a nitrogen gas flow to produce a film. This film was then peeled away from the Teflon substrate and moved onto a glass support, then slowly heated from 200° C. to 300° C. under a nitrogen gas flow, which yielded a silicone-containing polyimide resin film composed of structural units described by the following formulas.

(Chemical Formulas 38)

Structural Formula 1:

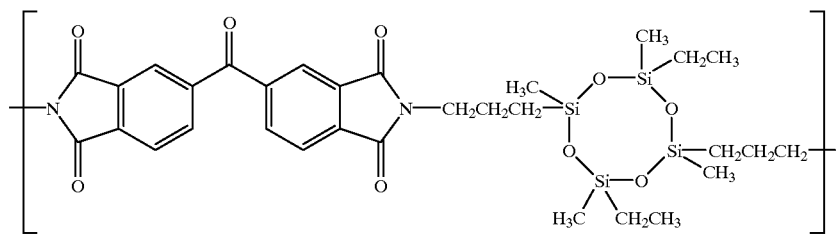

Structural Formula 2:

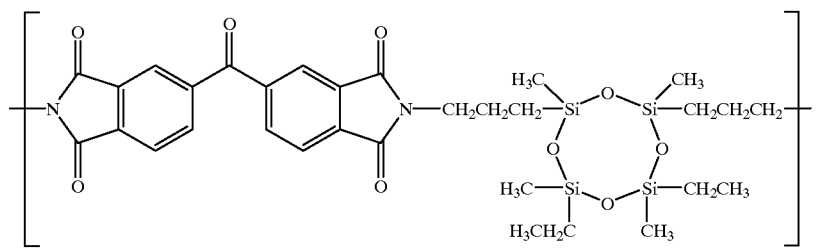

Structural Formula 3:

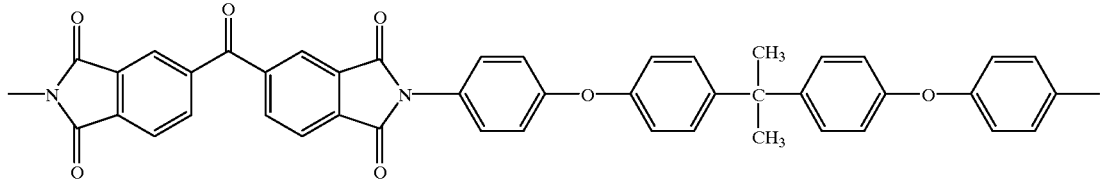

The copolymerization ratio (molar ratio) of (structural units described by the above Structural Formula 1): (structural units described by Structural Formula 2): (structural units described by Structural Formula 3) was 17.5:17.5:65. The appearance of the silicone-containing polyimide resin film obtained in this manner was visually evaluated. Also, the pyrolysis temperature, contact angle, and modulus of this film were measured, the results of which are given in Table 1.

Comparative Example 1

19.9 g Of 3,3',4,4'-benzophenonetetracarboxylic dianhydride were supplied under a nitrogen gas flow to a 500 mL four-neck flask equipped with an agitator, a dropping funnel, and a thermometer. 120 g Of dried N-methylpyrrolidone were added and dissolved, and then 8 g of a dried silicone-based divalent amine compound described by the following formula:

(Chemical Formula 39)

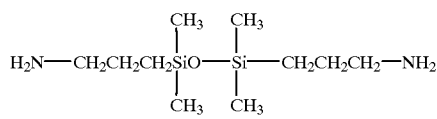

were slowly added dropwise at room temperature. The system was stirred for another hour upon completion of the addition. A solution produced by dissolving 12.1 g of 2,2-bis(2-diaminophenoxyphenyl)propane in 80 g of dried N-methylpyrrolidone was then slowly added dropwise under ice cooling. Upon completion of the addition, the system was agitated for another hour under ice cooling, then for another 4 hours at room temperature, which yielded an N-methylpyrrolidone solution of a silicone-containing polyamic acid composed of structural units described by the following formulas:

(Chemical Formula 40)

Structural Formula A:

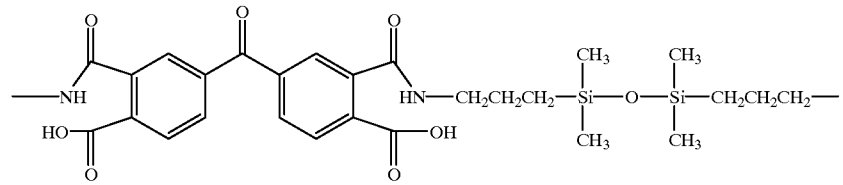

Structural Formula B:

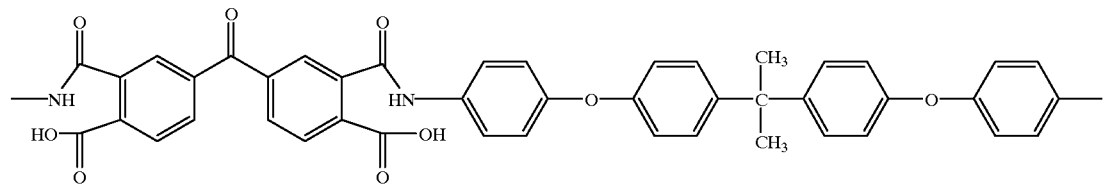

The copolymerization ratio (molar ratio) of (structural units described by the above Structural Formula A):(structural units described by Structural Formula B) was 52:48. The intrinsic viscosity of the silicone-containing polyamic acid obtained in this manner was measured in N-methylpyrrolidone and found to be 0.4 dL/g.

This N-methylpyrrolidone solution of a silicone-containing polyamic acid was used to coat a Teflon substrate, and this coating was slowly heated from 100° C. to 180° C. under a nitrogen gas flow to produce a film. This film was then peeled away from the Teflon substrate and moved onto a glass support, then slowly heated from 200° C. to 300° C. under a nitrogen gas flow, which yielded a silicone-containing polyimide resin film composed of structural units described by the following formulas:

in this manner was visually evaluated. Also, the pyrolysis temperature, contact angle, and modulus of this film were measured, the results of which are given in Table 1.

Comparative Example 2

16.12 g Of 3,3',4,4'-benzophenonetetracarboxylic dianhydride were supplied under a nitrogen gas flow to a 500 mL four-neck flask equipped with an agitator, a dropping funnel, and a thermometer. 120 g Of dried N-methylpyrrolidone were added and dissolved, and a solution produced by dissolving 20.52 g of 2,2-bis(2-diaminophenoxy-phenyl)propane in 80 g of dried N-methylpyrrolidone was then slowly added dropwise under ice cooling. Upon completion of the addition, the mixture was stirred for another hour under ice cooling, then for another 4 hours at room temperature, which yielded an N-methylpyrrolidone solution of a silicone-containing polyamic acid composed of structural units described by the following formula:

(Chemical Formulas 41)

Structural Formula 1:

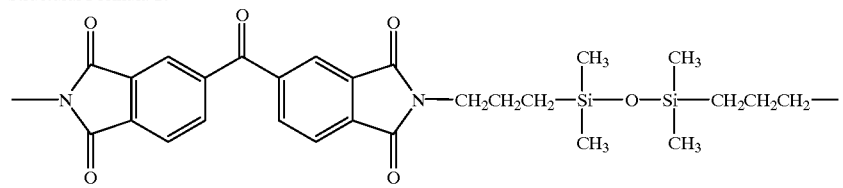

Structural Formula 2:

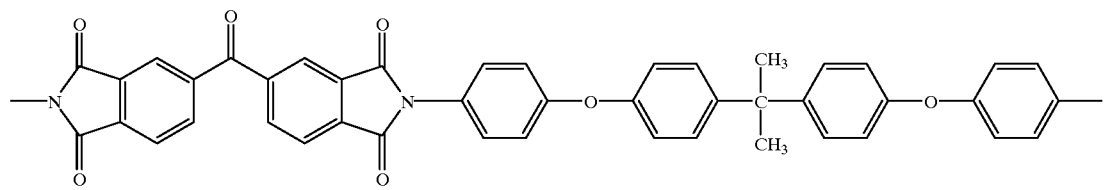

The copolymerization ratio (molar ratio) of (structural units described by Structural Formula 1):(structural units described by Structural Formula 2) was 52:48. The appearance of the silicone-containing polyimide resin film obtained Structural Formula A:

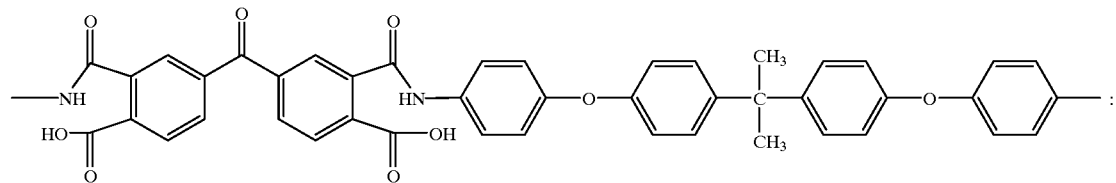

The intrinsic viscosity of the silicone-containing polyamic acid obtained in this manner was measured in N-methylpyrrolidone and found to be 0.4 dL/g.

This N-methylpyrrolidone solution of a silicone-containing polyamic acid was used to coat a Teflon substrate, and this coating was slowly heated from 100° C. to 180° C. under a nitrogen gas flow to produce a film. This film was then peeled away from the Teflon substrate and moved onto a glass support, then slowly heated from 200° C. to 300° C. under a nitrogen gas flow, which yielded a silicone-containing polyimide resin film composed of structural units described by the following formula:

Structural Formula 1:

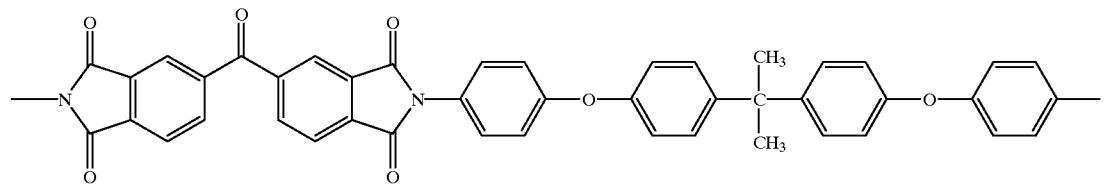

The appearance of the silicone-containing polyimide resin film obtained in this manner was visually evaluated. Also, the pyrolysis temperature, contact angle, and modulus of this film were measured, the results of which are given in Table 1.

Comparative Example 3

15.59 g Of 3,3',4,4'-benzophenonetetracarboxylic dianhydride were supplied under a nitrogen gas flow to a 500 mL four-neck flask equipped with an agitator, a dropping funnel, and a thermometer. 120 g Of dried N-methylpyrrolidone were added and dissolved, and then 8 g of a dried silicone-based divalent amine compound described by the following formula:

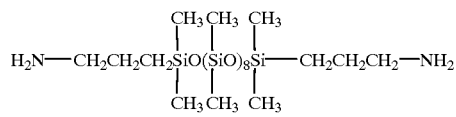

were slowly added dropwise at room temperature. The mixture was agitated for another hour upon completion of the addition. A solution produced by dissolving 16.41 g of 2,2-bis(2-diaminophenoxyphenyl)propane in 80 g of dried N-methylpyrrolidone was then slowly added dropwise under ice cooling. Upon completion of the addition, the mixture was agitated for another hour under ice cooling, then for another 4 hours at room temperature, which yielded an N-methylpyrrolidone solution of a silicone-containing polyamic acid composed of structural units described by the following formulas:

Structural Formula A:

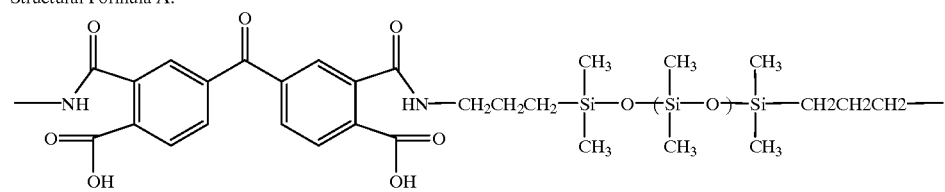

Structural Formula B:

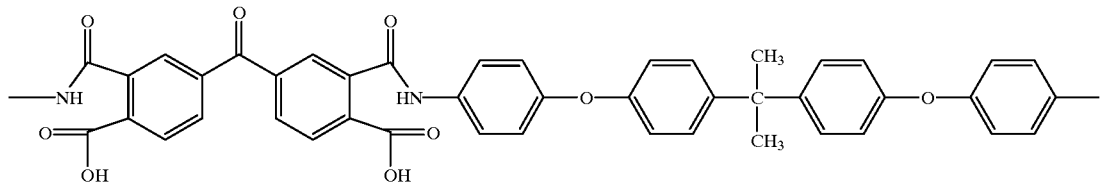

The copolymerization ratio (molar ratio) of (structural units described by Structural Formula A):(structural units described by Structural Formula B) was 17:83. The intrinsic viscosity of the silicone-containing polyamic acid obtained in this manner was measured in N-methylpyrrolidone and found to be 0.35 dL/g.

This N-methylpyrrolidone solution of a silicone-containing polyamic acid was used to coat a Teflon substrate, and this coating was slowly heated from 100° C. to 180° C. under a nitrogen gas flow to produce a film. This film was then peeled away from the Teflon substrate and moved onto a glass support, then slowly heated from 200° C. to 300° C. under a nitrogen gas flow, which yielded a silicone-containing polyimide resin film composed of structural units described by the following formulas.

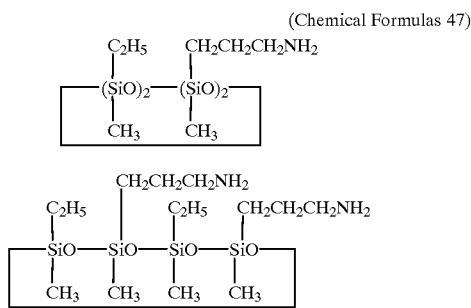
(Chemical Formulas 47)

Structural Formula 1:

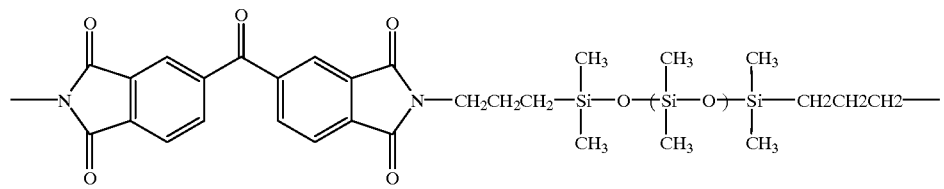

Structural Formula 2:

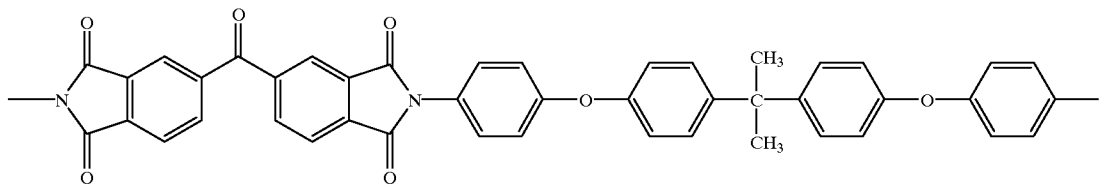

The copolymerization ratio (molar ratio) of (structural units described by Structural Formula 1):(structural units described by Structural Formula 2) was 17:83. The appearance of the silicone-containing polyimide resin film obtained in this manner was visually evaluated. Also, the pyrolysis temperature, contact angle, and modulus of this film were measured, the results of which are given in Table 1.

Working Example 2

17.42 g Of 3,3',4,4'-benzophenonetetracarboxylic dianhydride were supplied under a nitrogen gas flow to a 500 mL four-neck flask equipped with an agitator, a dropping funnel, and a thermometer. 120 g Of dried N-methylpyrrolidone were added and dissolved, and then 12 g of a mixture (mixing ratio: 50:50 mol %) of dried silicone-based divalent amine compounds described by the following formulas: was added dropwise at room temperature. Upon completion of the addition, the mixture was stirred for another hour at room temperature. A solution produced by dissolving 10.58 g of 2,2-bis(2-diaminophenoxyphenyl)propane in 80 g of dried N-methylpyrrolidone was then slowly added dropwise under ice cooling. Upon completion of the addition, the mixture was agitated for another hour under ice cooling, then for another 4 hours at room temperature, which yielded an N-methylpyrrolidone solution of a silicone-containing polyamic acid composed of structural units described by the following formulas:

(Chemical Formula 48)

Structural Formula A-1:

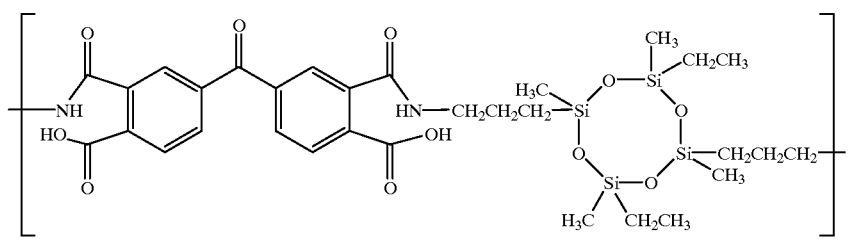

Structural Formula A-2:

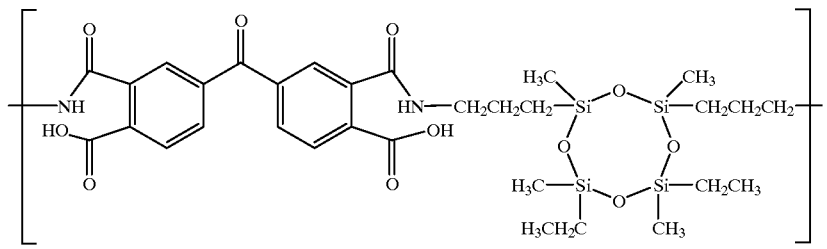

Structural Formula B:

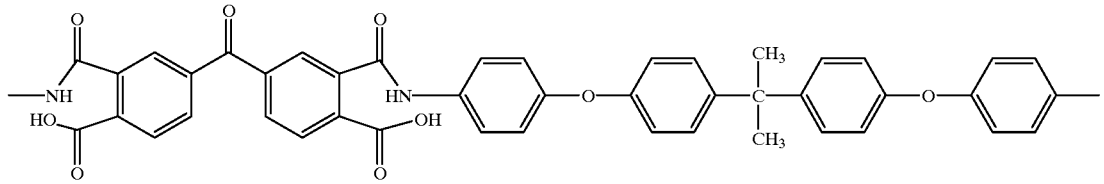

The copolymerization ratio (mol %) of (structural units described by Structural Formula A-1):(structural units described by Structural Formula A-2):(structural units described by Structural Formula B) was 26:26:48. The intrinsic viscosity of the silicone-containing polyamic acid obtained in this manner was measured in N-methylpyrrolidone and found to be 0.3 dL/g.

This N-methylpyrrolidone solution of a silicone-containing polyamic acid was used to coat a Teflon substrate, and this coating was slowly heated from 100° C. to 180° C. under a nitrogen gas flow to produce a film. This film was then peeled away from the Teflon substrate and moved onto a glass support, then slowly heated from 200° C. to 300° C. under a nitrogen gas flow, which yielded a silicone-containing polyimide resin film composed of structural units described by the following formulas:

(Chemical Formulas 49)

Structural Formula 1:

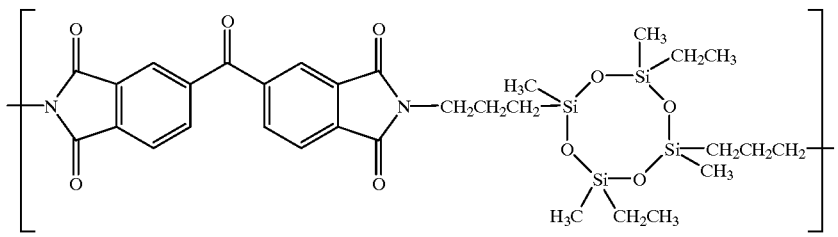

Structural Formula 2:

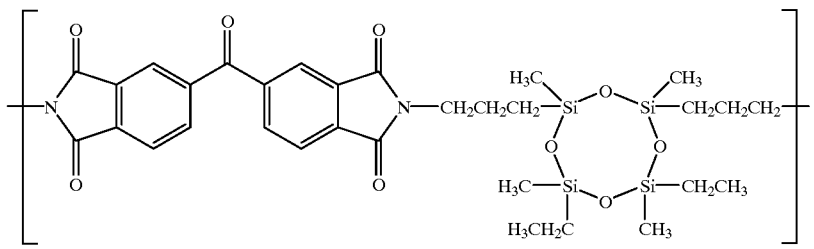

Structural Formula 3:

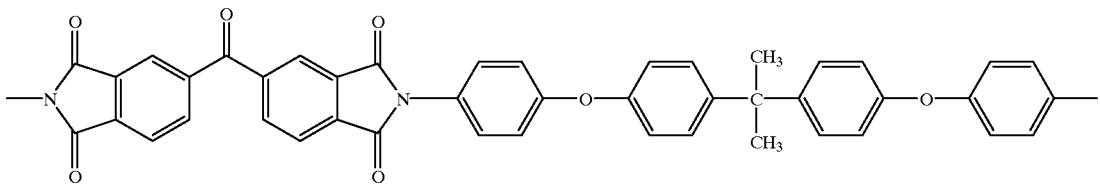

The copolymerization ratio (molar ratio) of (structural units described by Structural Formula 1):(structural units described by Structural Formula 2):(structural units described by Structural Formula 3) was 26:26:48. The appearance of the silicone-containing polyimide resin film obtained in this manner was visually evaluated. Also, the pyrolysis temperature, contact angle, and modulus of this film were measured, the results of which are given in Table 1.

TABLE 1

| | Appearance of film | Silicone content (wt %) | Pyrolysis temp. (° C.) 1% weight loss | Pyrolysis temp. (° C.) 5% weight loss | Contact angle (deg.) | Elastic modulus (kg/cm²) |
|---|---|---|---|---|---|---|
| W. E. 1 | evenly yellowish-brown, transparent | 20 | 475 | 510 | 95 | 670 |
| W. E. 2 | evenly yellowish-brown, transparent | 30 | 473 | 508 | 97 | 620 |
| C. E. 1 | evenly yellowish-brown, transparent | 20 | 473 | 503 | 92 | 890 |
| C. E. 2 | evenly yellowish-brown, transparent | 0 | 498 | 533 | 91 | 800 |
| C. E. 3 | evenly yellowish-brown, transparent | 20 | 457 | 500 | 102 | 680 |

(W. E.: Working Example; C. E.: Comparative Example)

We claim:

1. A silicone-containing polyimide resin comprising 0.1 to 100 mol % structural units described by formula

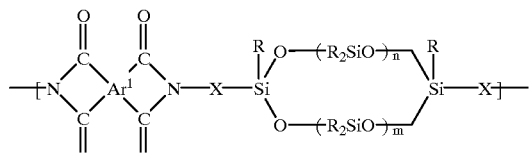

and 0 to 99.9 mol % structural units described by formula

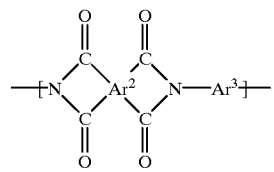

where $Ar^1$ and $Ar^2$ are tetravalent organic groups having at least one aromatic ring; $Ar^3$ is a divalent organic group having at least one aromatic ring; each R is an independently selected monovalent hydrocarbon group free of aliphatic unsaturated bonds; X is an alkylene group or alkyleneoxyalkylene group having at least two carbon atoms; m and n are integers from 0 to 3, and (m+n) is an integer from 1 to 6.

2. A silicone-containing polyimide resin as defined in claim 1, where the tetravalent organic groups represented by $Ar^1$ and $Ar^2$ are selected from the group consisting of

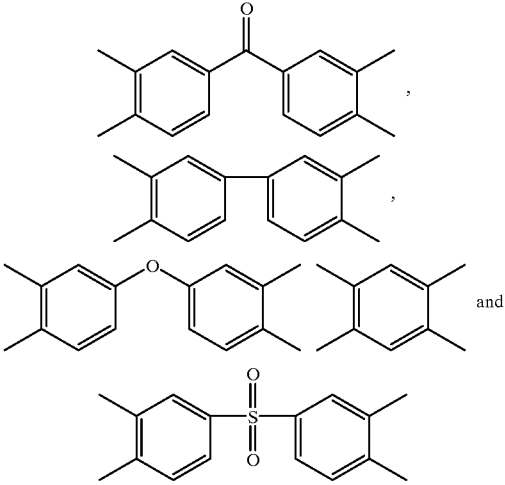

and the divalent organic group represented by $Ar^3$ is selected from the group consisting of

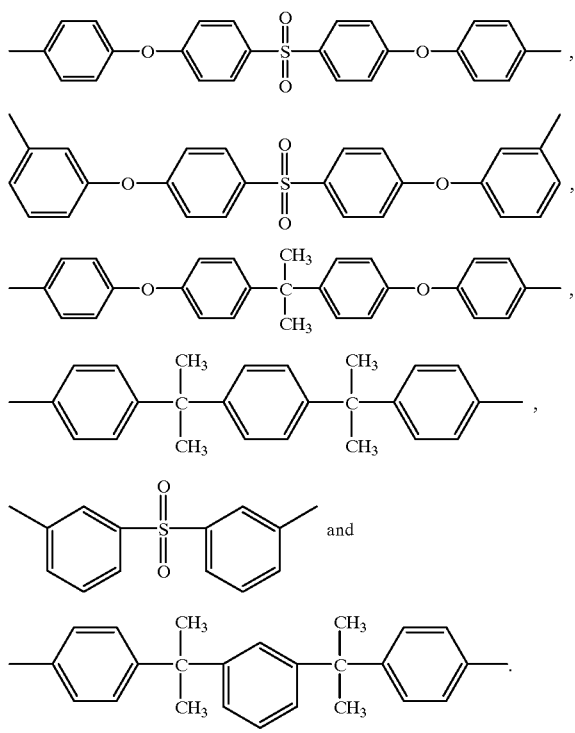

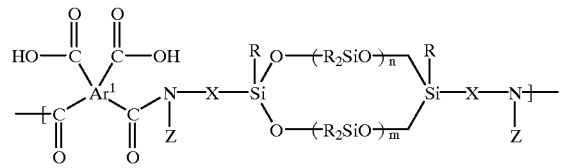

3. A method for manufacturing the silicone-containing polyimide resin of claim 1, comprising heating a silicone-containing polyamic acid comprising 0.1 to 100 mol % structural units described by formula and 0 to 99.9 mol % structural units described by formula

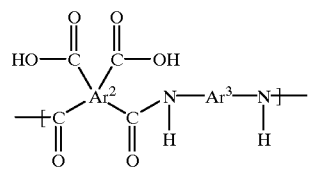

where $Ar^1$ and $Ar^2$ are tetravalent organic groups having at least one aromatic ring; $Ar^3$ is a divalent organic group having at least one aromatic ring; each R is an independently selected monovalent hydrocarbon group free of aliphatic unsaturated bonds; X is an alkylene group or alkyleneoxyalkylene group having at least two carbon atoms; Z is a hydrogen atom or a silyl group described by formula $-SiR_3$ where R is as previously defined; m and n are integers from 0 to 3, and (m+n) is an integer from 1 to 6; to effect a dehydration cyclization to produce an imide.

4. A method for manufacturing the silicone-containing polyimide resin of claim 3, where the tetravalent organic groups represented by $Ar^1$ and $Ar^2$ are selected from the group consisting of

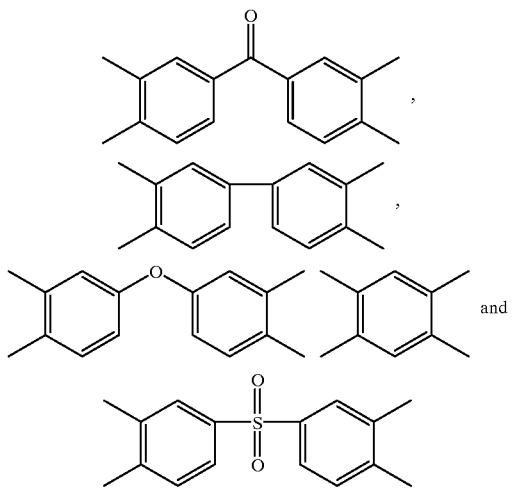

and the divalent organic group represented by $Ar^3$ is selected from the group consisting of

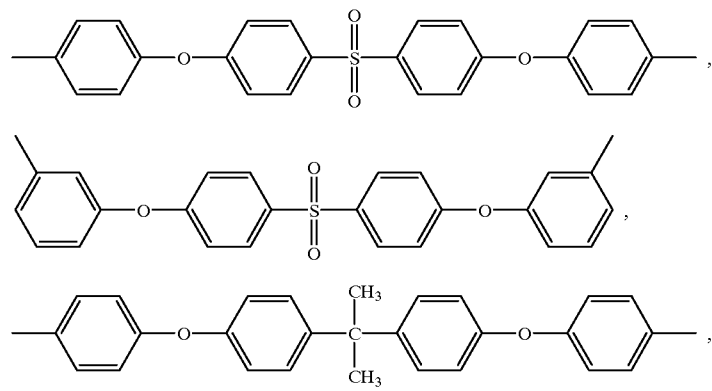

-continued

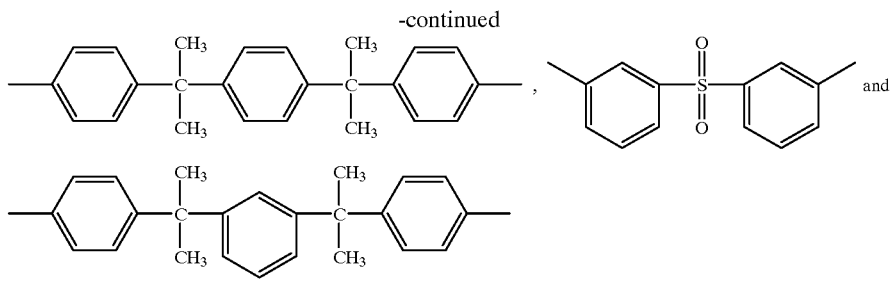

5. A silicone-containing polyimide resin as defined in claim 1, where (m+n) is 2 and m=1 and n=1.

6. A silicone-containing polyimide resin as defined in claim 1, where the ratio of structural units described by formula 1 to structural units described by formula 2 is between 1:99 and 100:0 mol %.

7. A silicone-containing polyimide resin as defined in claim 1 have an intrinsic viscosity in N-methylpyrrolidone solution at 25° C. of between 0.2 and 2.0 dL/g.

8. A silicone-containing polyamic acid comprising 0.1 to 100 mol % structural units described by formula 1

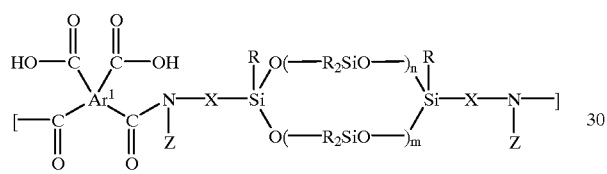

and 0 to 99.9 mol % structural units described by formula 2

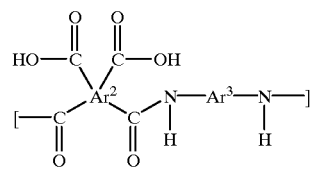

where $Ar^1$ and $Ar^2$ are tetravalent organic groups having at least one aromatic ring; $Ar^3$ is a divalent organic group having at least one aromatic ring; each R is an independently selected monovalent hydrocarbon group free of aliphatic unsaturated bonds; X is an alkylene group or alkyleneoxy-alkylene group having at least two carbon atoms; Z is a hydrogen atom or a silyl group described by formula —SiR$_3$ where R is as defined above; m and n are integers from 0 to 3, and (m+n) is an integer from 1 to 6.

9. A silicone-containing polyamic acid as defined in claim 8, where the tetravalent organic groups represented by $Ar^1$ and $Ar^2$ are selected from the group consisting of

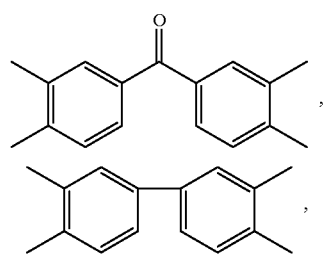

-continued

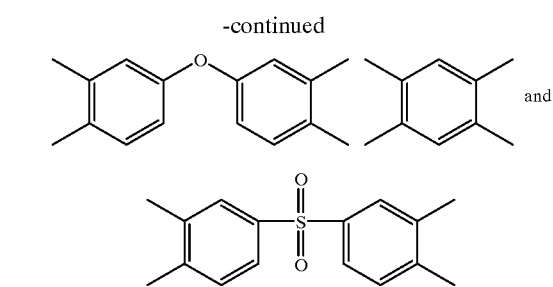

and the divalent organic group represented by $Ar^3$ is selected from the group consisting of

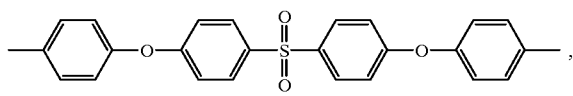

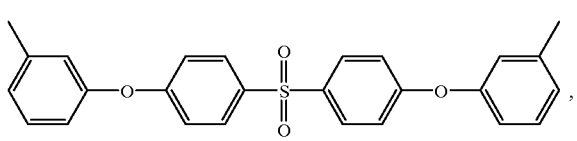

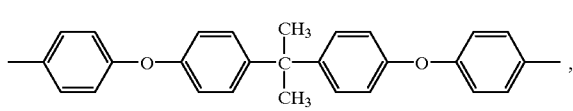

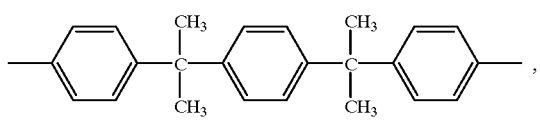

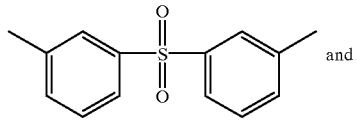

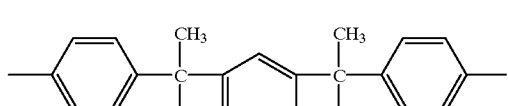

10. A method for manufacturing the silicone-containing polyamic acid defined in claim 3, comprising the polymerization of a mixture comprising a tetracarboxylic dianhydride described by formula

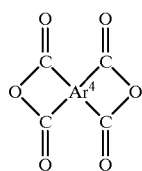

where Ar⁴ is a tetravalent organic group having at least one aromatic ring, a silicone-based divalent amine compound described by formula

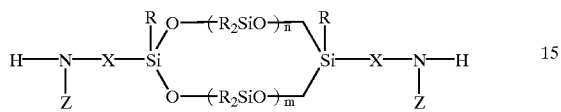

where each R is an independently selected monovalent hydrocarbon group free of aliphatic unsaturated bonds; X is an alkylene group or alkyleneoxyalkylene group having at least two carbon atoms; Z is a hydrogen atom or a silyl group described by formula —SiR₃ where R is as previously defined; m and n are integers from 0 to 3, and (m+n) is an integer from 1 to 6; and a divalent amine compound described by formula H₂N—Ar⁵—NH₂ where Ar⁵ is a divalent organic group having at least one aromatic ring.

11. A method for manufacturing the silicone-containing polyamic acid defined in claim 10, where the tetravalent organic groups represented by Ar¹ and Ar² are selected from the group consisting of

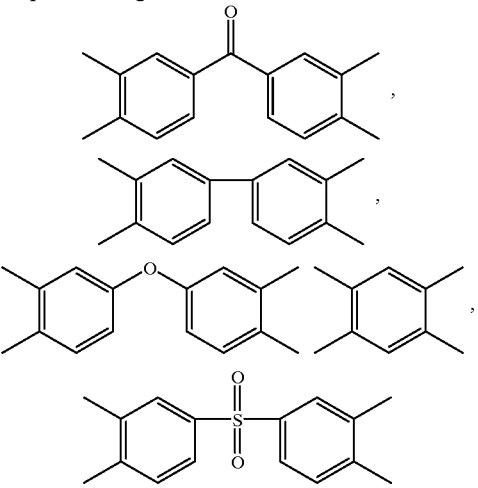

and the divalent organic group represented by Ar³ is selected from the group consisting of

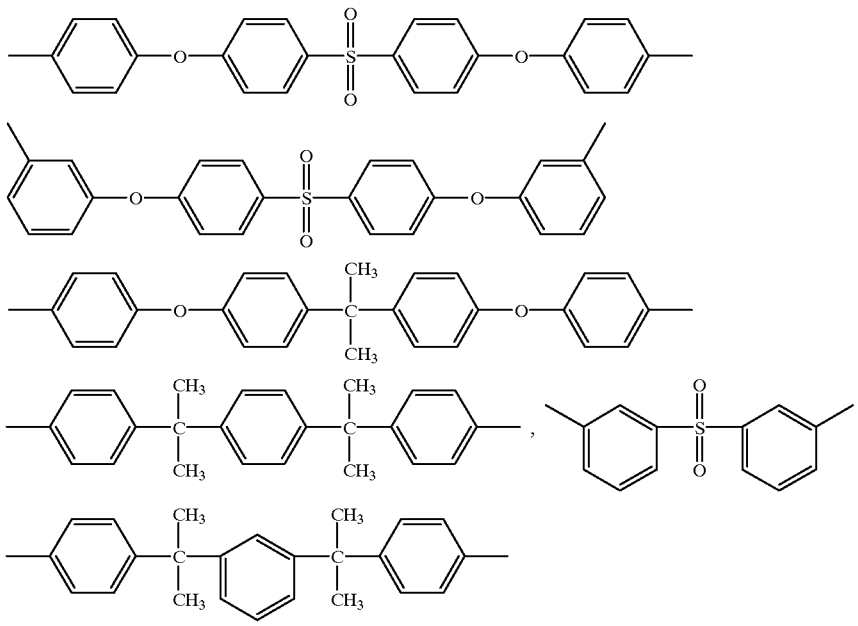

* * * * *